(12) United States Patent
Herbert

(10) Patent No.: US 7,204,049 B2
(45) Date of Patent: Apr. 17, 2007

(54) EMERGENCY DROP SYSTEM FOR AN AIRCRAFT ADVERTISING DISPLAY

(75) Inventor: Sean Patrick Herbert, Kings Langley (AU)

(73) Assignee: Heli-Banners Limited, London (GB)

( * ) Notice: Subject to any disclaimer, the term of this patent is extended or adjusted under 35 U.S.C. 154(b) by 236 days.

(21) Appl. No.: 10/149,961

(22) PCT Filed: Jan. 12, 2001

(86) PCT No.: PCT/AU01/00020

§ 371 (c)(1),
(2), (4) Date: Oct. 11, 2002

(87) PCT Pub. No.: WO01/52225

PCT Pub. Date: Jul. 19, 2001

(65) Prior Publication Data

US 2003/0056409 A1 Mar. 27, 2003

(30) Foreign Application Priority Data

Jan. 13, 2000 (AU) .................................... PQ 5054
Sep. 6, 2000 (AU) .................................... PQ 9949

(51) Int. Cl.
*G09F 21/06* (2006.01)

(52) U.S. Cl. ........................... 40/212; 40/214; 40/215; 244/94; 244/138 R; 244/142

(58) Field of Classification Search ................. 40/212, 40/214, 215, 216; 244/94, 138 R, 142; 446/49, 446/50, 51, 53, 68
See application file for complete search history.

(56) References Cited

U.S. PATENT DOCUMENTS

| 286,718 | A | * | 10/1883 | Linton ..................... 102/354 |
| 1,221,118 | A | * | 4/1917 | Ward ........................ 428/39 |
| 2,064,218 | A | * | 12/1936 | Richardson ............... 40/215 |
| 2,134,987 | A | * | 11/1938 | Shorb ....................... 40/215 |
| 2,931,597 | A | * | 4/1960 | Moore, Jr. ................ 244/97 |
| 3,683,530 | A |   | 8/1972 | Robinson ................. 40/215 |
| 5,755,405 | A | * | 5/1998 | Socha et al. ........... 244/142 |
| 6,182,924 | B1 | * | 2/2001 | Nott ........................ 244/95 |

FOREIGN PATENT DOCUMENTS

| GB | 411 298 A | 6/1934 |
| GB | 456 076 A | 11/1936 |
| GB | 463196    | 3/1937 |
| GB | 485 599 A | 5/1938 |
| ZA | 970020    | 1/1997 |

* cited by examiner

*Primary Examiner*—Gary C. Hoge
(74) *Attorney, Agent, or Firm*—Steptoe & Johnson LLP

(57) ABSTRACT

An emergency drop system allows ballasted advertising banner (14) if disconnected from an aircraft to descend slowly to the ground. Banner (14) is suspended below an aircraft by line (4) held taut by ballasted container (24). Static line (26) attached to the aircraft will, on release of loop (6) of line (4) from the aircraft, pull on closures (12) and release parachute (8) from its container (10). Drag of parachute (8) in the slipstream will slow the fall of banner (14) and also pull on lanyard (20) so that it activates 3-ring release (22) causing container (24) to invert and disperse the ballast.

17 Claims, 4 Drawing Sheets

EMERGENCY DROP SYSTEM FOR AN AIRCRAFT ADVERTISING DISPLAY

FIELD OF THE INVENTION

Figure 1:
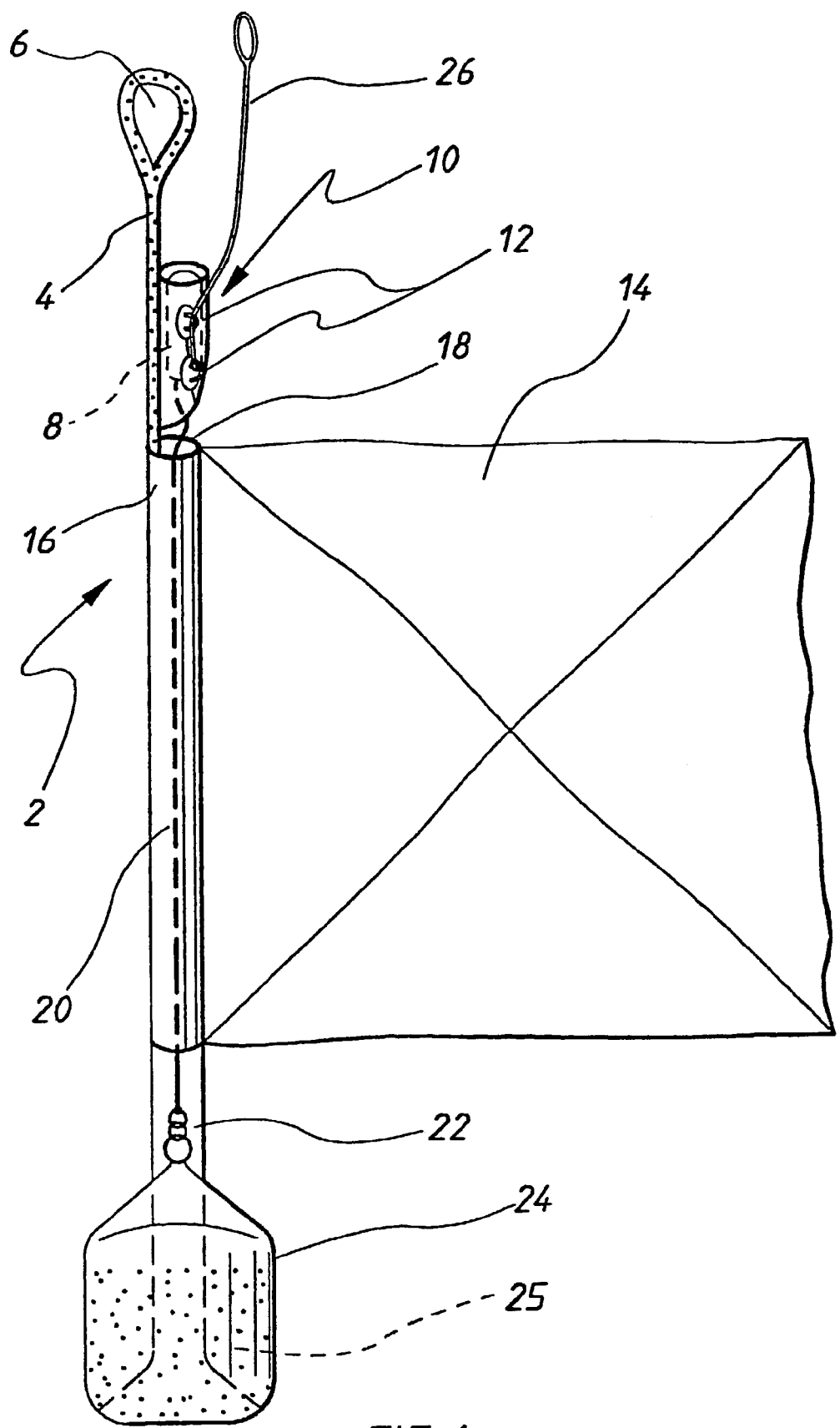
Figure 2:
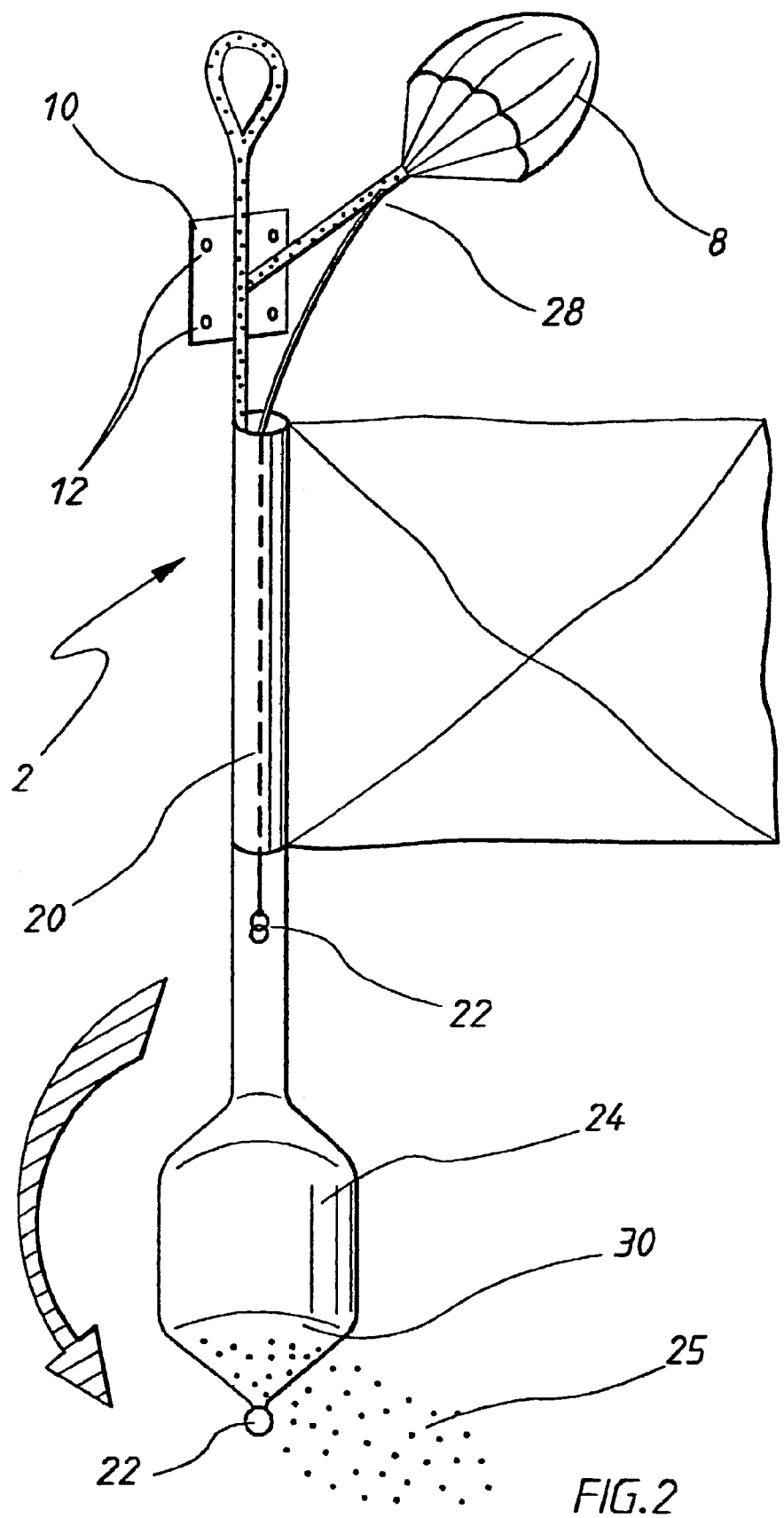
Figure 3:
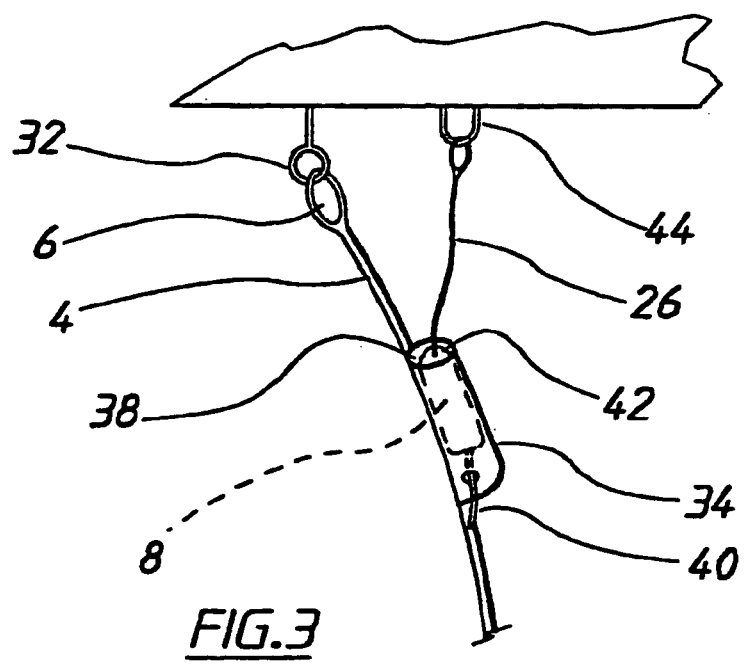
Figure 4:
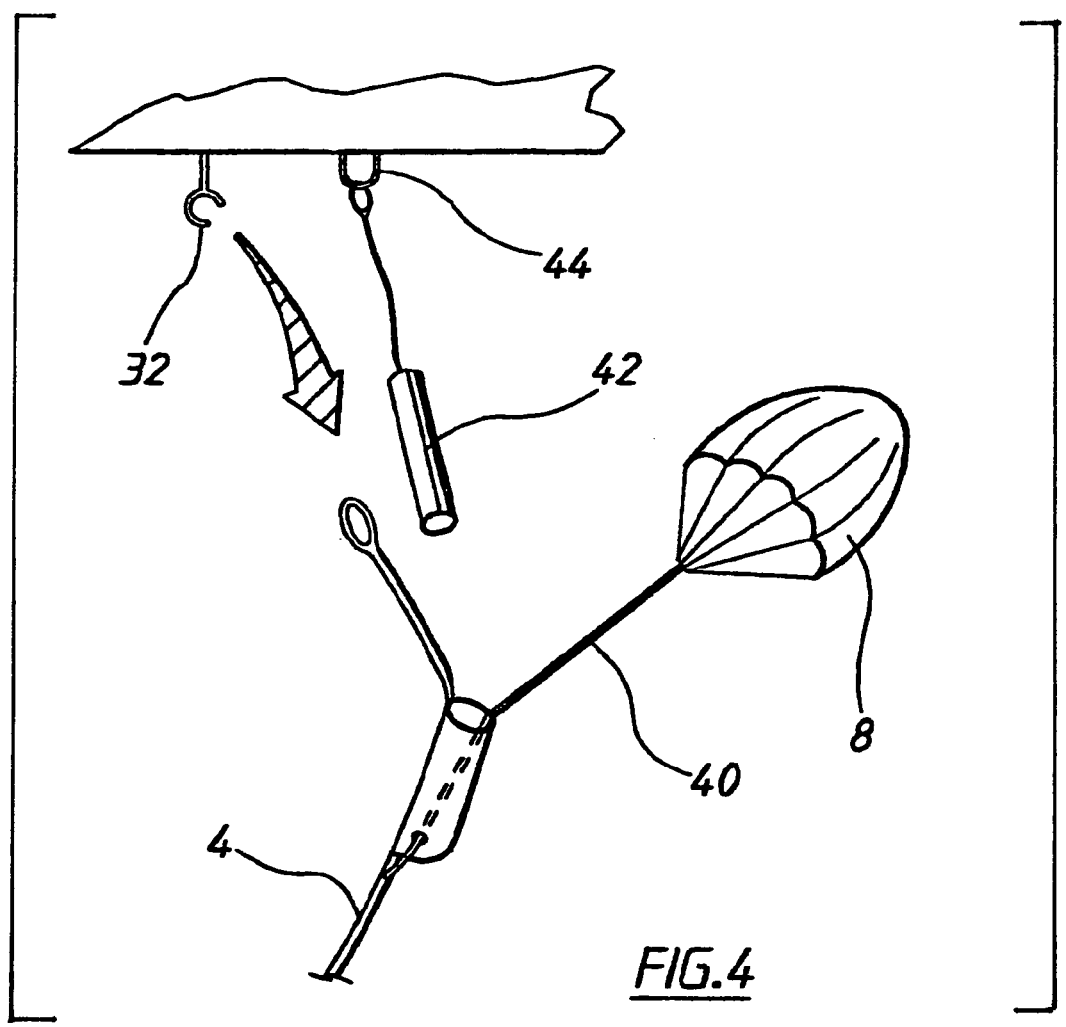
Figure 5:
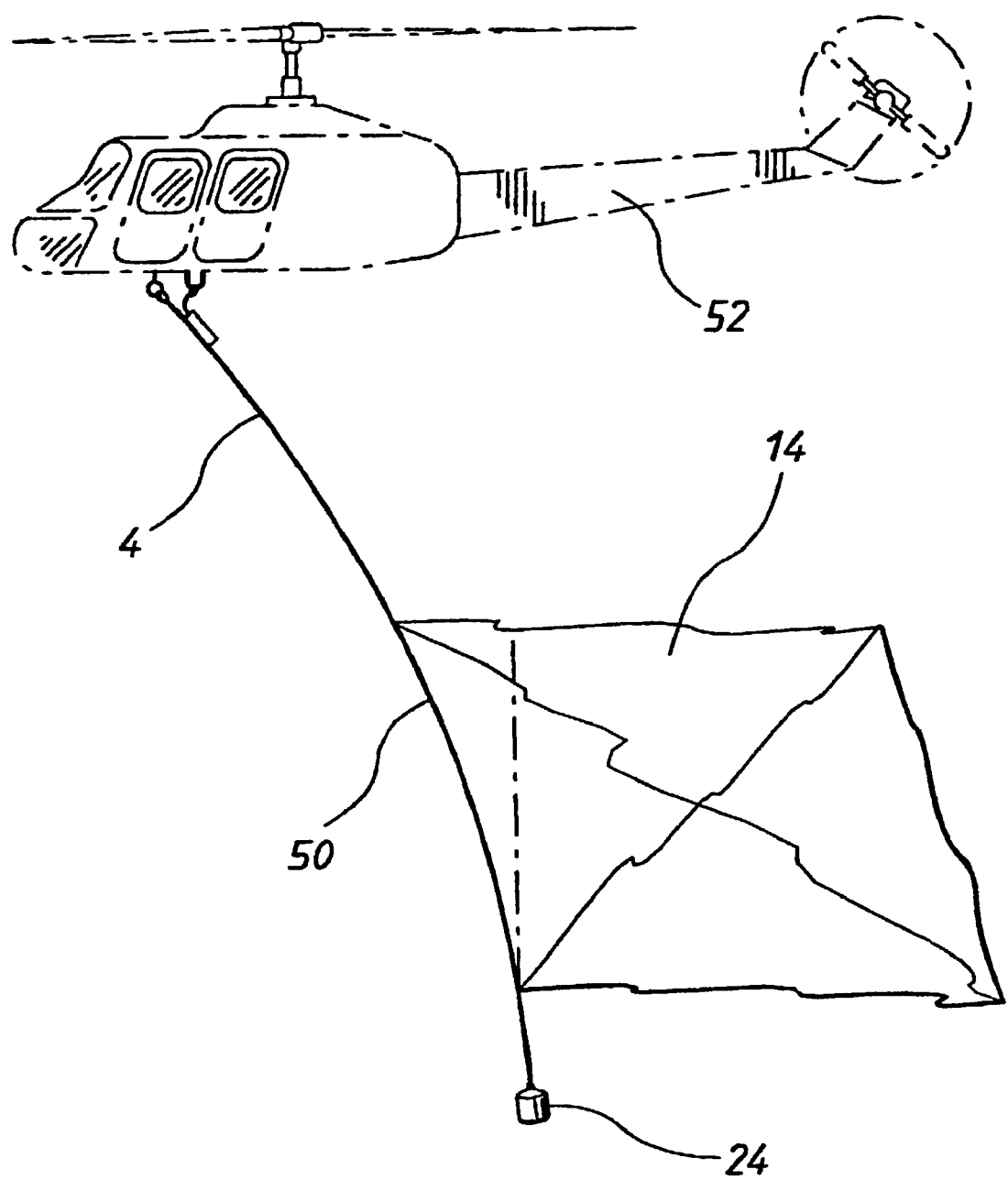

The present invention generally relates to an emergency drop system for an aircraft advertising display. In particular the invention relates to a system which enables a ballasted advertising display once disconnected from an aircraft in flight to descend slowly to the ground by activating a drag device and safely releasing the ballast to further slow the descent rate of the advertising display.

BACKGROUND OF THE INVENTION

Aerial advertising displays include skywriting, signs and logos on the sides of dirigibles, parachutists with indices on their canopies or having banners suspended from them during flight, and banners towed behind fixed-wing aeroplanes or suspended from slower moving aircraft such as helicopters, dirigibles and balloons. Aerial advertising displays have the advantage of being able to be seen by many thousands of people at gatherings such as outdoor concerts, sporting events, carnivals, shows, celebrations and by other members of the public outside at the beach, park, in the city or just walking around the streets.

Banners towed behind aeroplanes have the disadvantage of needing to be long and thin to minimise the drag to the aeroplane such as described in British Patent No. GB 463196A. Accordingly, most aeroplane banners are single line messages in plain font with little or no scope to display flags, logos, devices or signs. Further the high air speed of aeroplanes means that the message being displayed is not in the field of view of most spectators for very much time. Furthermore fixed-wing aeroplanes generally have restricted corridors in which they can fly over cities further limiting the time in which the advertising display is in the field of view of spectators.

Slower-moving aircraft such as helicopters, dirigibles and balloons often are allowed greater access to airspace over cities. The aircraft are more manoeuvrable and often are able to be better positioned for viewing by spectators whilst the lower airspeed allows for larger banners and flags to be towed below and behind the aircraft. A ballast is often also required to be attached from the flag bearing line suspended from the aircraft to keep the line taut and the flag or banner unfurled and correctly displayed during flight. The lower airspeed of the aircraft even to the point of hovering provides further advantages in that the aircraft and hence the advertising display stays in the field of view of spectators for greater lengths of time.

However a main disadvantage of ballasted flags and banners towed or suspended from aircraft is the danger presented to the public and the likelihood of property damage if the ballast or entire advertising display falls to earth after being released from the aircraft such as in an emergency or by accident. The Civil Aviation Safety Authority responsible for civil air safety in Australia generally does not permit helicopters and airships to fly over land with ballasted advertising displays suspended from the aircraft due to the potential danger to property or the public should the ballasted display become disconnected from the aircraft and fall. Approval for ballasted aircraft held advertising displays is generally only given for flights over water, which severely restricts the benefits and advantages provided by aircraft advertising displays for the viewing public.

Accordingly then there exists a requirement for further developments and improvements in ballasted aerial advertising displays or at least the provision of an alternative to existing aerial advertising display systems. In particular there exists a requirement for an emergency drop system for a ballasted advertising display suspended from an aircraft to allow the aircraft to be flown over land, property, buildings and the public without any significant risk of harm to the public or damage to property if the ballasted display separates from the aircraft during flight.

SUMMARY OF THE INVENTION

According to a first aspect of the present invention there is provided an emergency drop system for an aircraft held advertising display, said system enabling a ballasted advertising display once disconnected from an aircraft in flight to descend slowly to the ground by activating a drag device and safely releasing the ballast to further slow the descent rate of the advertising display.

Further to the first aspect of the present invention there is provided an emergency drop system for an aircraft held advertising display, said system including a suspension line adapted to be releaseably attached to the aircraft and held taut below the aircraft by a ballast container loaded with dispersive material ballast, said suspension line being adapted for attachment of a banner above the ballast when deployed, and a static line attached to the aircraft and releaseably joined to a drag device attached to said suspension line, wherein when the advertising display is released from the aircraft in flight and begins to descend under gravity the static line attached to the aircraft activates the release of said drag device to retard the descent rate of said advertising display, and the static line further initiates the release of said dispersive material ballast from the ballast container further slowing the descent rate of said advertising display.

In a second aspect of the present invention there is provided a method for displaying an aerial advertisement, said method including the step of suspending a ballasted advertising display from an aircraft said advertising display having an emergency drop system adapted to activate a drag device and safely release the ballast to slow the decent rate of the advertising display if disconnected from the aircraft in flight.

Preferably the aircraft is a helicopter, airship or balloon, more preferably a helicopter.

Preferably the banner carries an advertisement, symbol, sign, flag or indices.

Preferably the dispersive material ballast is water or a finely divided particulate material which readily disperses upon being released from the ballast container. Preferably the finely divided particulate material is sand, more preferably a high silicon-content sand such as beach sand.

Preferably the drag device is a parachute or drogue. Preferably the parachute is held in a container attached to the suspension line and activation of the static line allows for release of the parachute from the container. Alternatively the parachute may be contained at the top of the leading edge of the banner.

Preferably the parachute container is a two part sock system including an inner sock connected to the aircraft by the static line, the inner sock being adapted to releaseably hold the parachute, and an outer sock adapted to releaseably contain the inner sock holding the parachute, the outer sock being attached to the suspension line and the parachute being connected to the suspension line by a bridle.

Preferably the static line also directly activates the release of the dispersive material ballast. Alternatively inflation of the parachute operates a lanyard joining the parachute to the ballast container to release the dispersive material ballast.

Preferably the static line or lanyard operates a 3-ring release associated with the ballast container, and activation of the 3-ring release causes the ballast container to invert allowing the dispersive material to fall from an opening in the container under gravity. Alternatively or concurrently activation of the static line or lanyard allows containment flaps on the ballast container to open allowing the dispersive material to fall from the container under gravity.

The nature of the invention will now be further described by way of example only with reference to the following detailed description and views illustrated in the accompanying drawings.

BRIEF DESCRIPTION OF THE DRAWINGS

FIG. 1 illustrates a side view of an emergency drop system for an aircraft held advertising display of the present invention for releasable attachment to an aircraft;

FIG. 2 illustrates the activated emergency drop system soon after release of the advertising display from the aircraft in flight;

FIG. 3 illustrates a side view of the emergency drop system with an alternative parachute deployment system;

FIG. 4 illustrates the activated emergency drop system with the alternative parachute deployment system; and FIG. 5 illustrates the banner of the advertising display held by the aircraft inflight, the banner having a curved leasing edge to compensate for the current induced by the forward movement of the aircraft.

DETAILED DESCRIPTION OF THE INVENTION

FIG. 1 illustrates an emergency drop system 2 of the invention. In accordance with terminology generally used in the parachute rigging industry emergency drop system 2 has a suspension line 4 with a loop 6 for releasable attachment to a helicopter hook (not shown). A drag device such as a parachute 8 is held in parachute container 10 affixed to suspension line 4 and held shut by closures 12. Banner 14 is affixed to suspension line 4 composed of folded webbing 16 having formed therein a conduit 18 with lanyard 20 passing there through to 3-ring release 22 on suspension line 4. The 3-ring release 22 securely holds ballast container 24 upright preventing escape of dispersive material 25 contained therein. Static line 26 joins a strong point of the helicopter (not shown) and closing loops 12 of parachute container 10.

FIG. 2 illustrates the emergency drop system 2 once released from the helicopter. Static line 26 is still attached to the helicopter (both not shown) having opened parachute container 10 at closures 12 and releasing the now inflated parachute 8 from container 10. Lanyard 20 connected to base 28 of parachute 8 has been pulled by the inflation of parachute 8 activating 3-ring release 22. Activation of 3-ring release 22 causes ballast container 24 to be inverted by the opposing forces of gravity and the drag of parachute 8 and allows dispersive material 25 to fall from opening 30 in ballast container 24.

FIG. 3 illustrates an alternative parachute deployment system. In this embodiment suspension line 4 connected to helicopter sling hook 32 by loop 6 has attached outer sock 34 having opening 38. Parachute 8 attached to suspension line 4 by bridle 40 is contained in inner sock 42, which in turn is contained in outer sock 34 through opening 38. Inner sock 42 is attached to static line 26 connected to helicopter strong point 44. Activation of sling hook 32 releases suspension line 4 and inner sock 42 is pulled free from outer sock 34 by static line 26 as the advertising display falls from the helicopter.

FIG. 4 illustrates parachute 8 once the emergency drop system has been activated. Parachute 8 is now inflated but still connected to suspension line 4 by bridle 40. Inner sock 42 hangs from the helicopter strong point 44 by static line 26.

Leading edge 50 of banner 14 may be suitably shaped as shown in FIG. 5 to compensate for the induced curve in suspension line 4 resulting from the forward movement of helicopter 52 and the opposing drag of banner 14. The degree of curve from the vertical required in constructing banner 14 will vary depending on the planned air speed of helicopter 52, drag of banner 14, weight of ballast 24 and the like as may be determined by those skilled in the art.

In flight the ballast keeps the suspension line taut from which the banner flies. However should the ballasted display become disconnected from the aircraft in flight, the ballast material is released from the ballast container and readily disperses as it falls to earth under gravity.

The dispersive material is preferably a finely divided particulate material which is free flowing. Sand is a preferred dispersive particulate material, whilst a high silicon-content sand such as beach sand is highly preferred for use as ballast in the emergency drop system of the present invention. High silicon-content sand does not significantly bind on standing or when compacted in the ballast container upon storage over time, nor even in the event of the sand getting damp or wet. The ballast may also conveniently be water or other such liquid, in which case the ballast container should be substantially watertight.

Dispersion of the ballast is important as the mass of the ballast is typically 50–100 kg and may be up to 150 kg or more for a 300–900 $m^2$ (3,000–10,000 square foot) and up to a 2,800+$m^2$ (30,000+ square foot) banner. It has been found that a ballast of 100 kg is particularly suitable for a 30×30 m (900 $m^2$) banner. A person skilled in the art will readily be able to determine the best ballast mass for a given banner size, fabric type, construction and air speed of the aircraft. Any dispersive material would be suitable for use as ballast provided that upon being dropped from a height the ballast material readily disperses as it fall through the air under gravity. In this way, any possible risk of damage of property or the public is avoided as the fluent particulate matter will be dispersed in the air and slowly descend to the ground with little or no risk of damage to property; compared to for example the damage which could be caused by dropping a solid or unitary ballast such as a 100 kg block of lead from a height over a populated or built-up area.

Once the dispersive material ballast is released from the ballast container, the mass of the advertising display is significantly reduced, the drag device slowing the rate of descent of the display to a speed sufficiently slow to avoid or minimise any damage to property or the public on landing allowing for the safe release of the advertising display during flight.

Opening of the ballast container may be activated by inflation of the parachute by means of a lanyard joining, for example, the base of the parachute to a release mechanism on the ballast container or container closure loops. Alternatively opening of the ballast container may be activated by action of the static line which further extends from the parachute container closure loops to the ballast container closure. Other suitable means of releasing the ballast from the ballast container are possible as may be determined by those skilled in the art.

The banner preferably carries an advertisement, symbol, sign, logo or other such indices. As such the banner may also be a sponsorship flag or an advertisement of trade names for goods and/or services.

The banner may be made of any suitable light-weight material like F-152 (type) nylon taffeta, or other materials such as cotton, rayon, polyester, twill, mixtures thereof and the like.

The drag device is preferably a round or conical parachute typically of about 3 m (9 feet) in diameter. The exact characteristics of the drag device for use in the present invention can vary greatly and will be readily determined by those skilled in the art depending on the particular circumstances in which the advertising display is used and the size and drag characteristics of the banner. The parachute canopy may be made of any suitable material such as F-111 (type) rip-stop nylon, sailcloth or other non- or semi-permeable material. The parachute may also be similar to those used to decelerate drag cars. Deployment of the parachute may optionally be pilot-chute assisted. Staged deployment may be effected by diapering the parachute canopy, if desired.

The parachute is most preferably contained to avoid premature deployment and to protect it from the elements. The parachute may be held in a container which is conveniently affixed to the suspension line, at the top of the leading edge of the banner, or at other places as appropriate. The container is opened by activation of the static line or similar. Any suitable opening device known in the art such as rip cord and shot cord closure loops, curved pin and gutted nylon suspension line closure loops, break-ties and the like may be employed. The mouth of the parachute canopy may be held closed with a diaper and the diapered canopy secured to the suspension line, top of the leading edge of the banner or other suitable place with Spandex elastic or the like. The parachute closure may also have fitted any suitable automatic activation device (AAD) such as a Cyprus™ which activates deployment of the parachute above a pre-set decent rate at a pre-set height instead of or in addition to the static line deployment.

Alternatively, the parachute is contained by a first, inner sock made of Spandex, which is contained in and by a second, outer sock also made of Spandex. The first sock is static lined to the aircraft whilst the second sock remains on the suspension line or parachute bridle. Other suitable deployment methods and systems as known by those skilled in the art may be employed without departing from the scope or spirit of the invention.

The ballast container may have a similar or different closure system to that of the parachute container. The parachute container may be a simple diaper or fully enclosed 4-flap system or similar having a number of flaps arranged in an overlapping relationship to form the container. The ballast container is preferably a bag made of canvas, nylon parachute pack or other such durable material having an opening held upright during use to ensure that the dispersive material ballast does not escape during normal use, but will escape if the aircraft held advertising display is released during flight. The ballast container may further be constructed from a number of overlapping flaps to form the container, yet allow for ready dispersion of the dispersive material when it is to be released.

The advertising display may be presented as one piece or may be separated into two, three or more segments. In an embodiment of the invention the suspension line loop for attachment to the helicopter is attached to the banner to which the ballast is also attached. Attachment may also be by any suitable means such as carabineer or the like. The advertising display is releaseably attached to the underside of the helicopter typically by a slink hook or snap shackle which can be activated by the helicopter pilot and/or other person on board.

The suspension line down to the banner attachment is preferably a round line of small diameter such as standard 227 kg (500 lb) nylon parachute canopy line or round abseiling line. Ribbon-like webbing is not preferred in the top part of the suspension line due to possible turbulence resulting from the airspeed of the aircraft during flight. The length of the suspension line down to the banner attachment is typically 30 m for a 30×20 m² banner.

The suspension line to which the banner and ballast is attached may also be made of 227 kg (500 lb) nylon canopy line, or more preferably is standard Atlas seatbelt webbing. The seatbelt webbing when used is preferably folded over and sewn with the leading edge of the banner between the two side edges of the webbing in order to attach the banner to the lanyard. Folding over and sewing the webbing creates a conduit suitable for housing the static line or lanyard to the ballast container release. A swivel may also be used on the suspension line if required to negate any rotation of the ballast container during flight.

The static line and suspension line loop may be separately attached to a strong point of the aircraft by any suitable means such as by carabineer, U-bolt or the like. The advertising display is preferably remotely released by the pilot of the aircraft if required in an emergency during flight or at any other time as desired. The static line activates the parachute opening and remains attached to the aircraft as the advertising display falls away under gravity. The static line may be housed in the round line sheath of the suspension line or may be separate from the suspension line as desired. The static line may also directly activate the release of the ballast material or alternatively a lanyard attached to the base of the parachute may activate the release of the ballast upon parachute inflation.

The 3-ring release associated with the ballast container, and other methods of opening the ballast container to allow for release of the dispersive material ballast are well known to those skilled in the art such as parachute riggers. The load bearing suspension lines, static lines, bridles and the like may be selected by those skilled in the art depending on the size, shape, mass, length and fabric of the aerial advertising display.

The emergency drop system of the invention finds industrial application in the safe display of ballasted advertising banners suspended from aircraft flying over populated and built-up areas.

The reference to any prior art in this specification is not, and should not be taken as, an acknowledgment or any form of suggestion that that prior art forms part of the common general knowledge in the field of endeavour.

Those skilled in the art will appreciate that the invention described herein the susceptible to variations and modifications other than those specifically described. It is to be understood that the invention includes all such variations and modifications. The invention also includes all of the steps, features, compositions and compounds referred to or indicated in the specification, individually or collectively, and any and all combinations of any two or more of said steps or features.

The invention claimed is:

1. An emergency drop system for an aircraft held advertising display, said system including a suspension line adapted to be releaseably attached to the aircraft and the suspension line is held taut below the aircraft by a ballast container loaded with dispersive material ballast, said suspension line being adapted for attachment of a banner to the suspension line above the ballast container when deployed, and a static line attached to the aircraft and releaseably joined to a parachute attached to said suspension line, wherein when the banner is released from the aircraft in flight and begins to descend under gravity the static line attached to the aircraft activates the release of said parachute to retard the rate of descent of said banner, and wherein the static line initiates the release of said dispersive material ballast from the ballast container.

2. An emergency drop system of claim 1, wherein the dispersive material ballast is water or a finely divided particulate material.

3. An emergency drop system of claim 2, wherein the finely divided particulate material is sand.

4. An emergency drop system of claim 1, wherein the parachute is held in a container attached to the suspension line or top of a leading edge of the banner, and activation of the static line allows for release of the parachute from the container.

5. An emergency drop system of claim 4, wherein the container is a two part sock system including an inner sock connected to the aircraft by the static line, the inner sock being adapted to releaseably hold the parachute, and an outer sock adapted to releaseably contain the inner sock holding the parachute, the outer sock being attached to the suspension line and the parachute being connected to the suspension line by a bridle.

6. An emergency drop system of claim 1, wherein the static line also directly activates the release of the ballast.

7. An emergency drop system of claim 6, wherein the static line operates a 3-ring release associated with the ballast container, and activation of the 3-ring release causes the ballast container to invert allowing the dispersive material ballast to fall from an opening in the ballast container under gravity.

8. An emergency drop system of claim 1, wherein inflation of the parachute operates a lanyard joining the parachute to the ballast container to release the ballast.

9. An emergency drop system of claim 8, wherein the lanyard operates a 3-ring release associated with the ballast container, and activation of the 3-ring release causes the ballast container to invert allowing the dispersive material ballast to fall from an opening in the ballast container under gravity.

10. An emergency drop system of claim 1, wherein the aircraft is a helicopter, airship or balloon.

11. An emergency drop system of claim 1, wherein the banner carries an advertisement, symbol, sign, flag or indices.

12. An emergency drop system of claim 1, wherein the static line initiates the release of the dispersive material before the release of the parachute.

13. A method for displaying an aerial advertisement, said method including the steps of suspending a ballasted advertising display from an aircraft, providing said advertising display with a banner and an emergency drop system adapted to activate a parachute and safely release dispersive material ballast to slow the rate of decent of the advertising display if disconnected from the aircraft in flight, providing said emergency drop system with a suspension line adapted to be releaseably attached to the aircraft and the suspension line is held taut below the aircraft by a ballast container loaded with the dispersive material ballast, said suspension line being adapted for attachment of the banner above the ballast container when deployed, and providing a static line attached to the aircraft and releaseably joined to a parachute attached to said suspension line, wherein when the advertising display is released from the aircraft in flight and begins to descend under gravity the static line attached to the aircraft activates the release of said parachute to retard the rate of descent of said advertising display, and the static line further initiates the release of said dispersive material ballast from the ballast container further slowing the rate of descent of said advertising display.

14. A method of claim 13, wherein the banner carries a symbol, sign, logo, flag or indices.

15. A method of claim 13, wherein the dispersive material ballast is water or a finely divided particulate material.

16. A method of claim 15, wherein the finely divided particulate material is sand.

17. An emergency drop system for an aircraft held advertising display, said system including a suspension line adapted to be releaseably attached to the aircraft and the suspension line is held taut below the aircraft by a ballast container loaded with dispersive material ballast, said suspension line being adapted for attachment of a banner to the suspension line above the ballast container when deployed, and a static line attached to the aircraft and releaseably joined to a parachute attached to said suspension line, wherein when the banner is released from the aircraft in flight and begins to descend under gravity the static line attached to the aircraft activates the release of said parachute to retard the rate of descent of said banner, and the static line initiates the release of said dispersive material ballast from the ballast container further slowing the rate of descent of said banner, wherein the container is a two part sock system including an inner sock connected to the aircraft by the static line, the inner sock being adapted to releaseably hold the parachute, and an outer sock adapted to releaseably contain the inner sock holding the parachute, the outer sock being attached to the suspension line and the parachute being connected to the suspension line by a bridle.

* * * * *